US009674561B2

(12) United States Patent
Magee et al.

(10) Patent No.: US 9,674,561 B2
(45) Date of Patent: *Jun. 6, 2017

(54) SVC-TO-AVC REWRITER WITH OPEN-LOOP STATISTAL MULTPLEXER

(71) Applicant: ARRIS Enterprises, Inc., Suwanee, GA (US)

(72) Inventors: Mark R. Magee, Campbell, CA (US); Sukesh V. Kaithakapuzha, Fremont, CA (US); Sean T. McCarthy, San Francisco, CA (US); Wayne D. Michelsen, Santa Clara, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,292

(22) Filed: Jul. 20, 2015

(65) Prior Publication Data
US 2015/0326858 A1 Nov. 12, 2015

Related U.S. Application Data

(63) Continuation of application No. 12/973,458, filed on Dec. 20, 2010, now Pat. No. 9,118,939.

(51) Int. Cl.
*H04N 7/12* (2006.01)
*H04N 21/2365* (2011.01)
(Continued)

(52) U.S. Cl.
CPC ..... *H04N 21/23655* (2013.01); *H04N 19/124* (2014.11); *H04N 19/14* (2014.11);
(Continued)

(58) Field of Classification Search
CPC ... H04N 21/234309; H04N 21/234327; H04N 21/23655; H04N 21/8451; H04N 19/61;
(Continued)

(56) References Cited

U.S. PATENT DOCUMENTS 5,506,844 A 4/1996 Rao
6,731,685 B1 5/2004 Liu et al.
(Continued)

FOREIGN PATENT DOCUMENTS

| CN | 101529911 A | 9/2009 |
|---|---|---|
| WO | 2010002420 A1 | 1/2010 |
| WO | 2010057213 A1 | 5/2010 |

OTHER PUBLICATIONS

Official Action, RE: Chinese Application No. 2011800061448.9, dated Sep. 6, 2015.
(Continued)

*Primary Examiner* — Gims Philippe
*Assistant Examiner* — Richard Carter
(74) *Attorney, Agent, or Firm* — Thomas A. Ward

(57) ABSTRACT

A method for processing a plurality of multilayer bit streams includes receiving a plurality of multilayer bit streams each having a base layer and at least one enhancement layer. One or more of the enhancement layers are extracted in whole or in part from at least one of the multilayer bit streams so that the plurality of multilayer bit streams are collectively reduced in their total bandwidth. Each of the multilayer bit streams are rewritten to a single layer bit stream. The single layer bit streams are multiplexed to form a multiplexed single layer bit stream.

14 Claims, 4 Drawing Sheets

(51) Int. Cl.

| | |
|---|---|
| *H04N 19/187* | (2014.01) |
| *H04N 19/66* | (2014.01) |
| *H04N 21/2343* | (2011.01) |
| *H04N 21/845* | (2011.01) |
| *H04N 19/30* | (2014.01) |
| *H04N 19/61* | (2014.01) |
| *H04N 19/124* | (2014.01) |
| *H04N 19/14* | (2014.01) |
| *H04N 19/18* | (2014.01) |
| *H04N 19/40* | (2014.01) |

(52) U.S. Cl.
CPC ........... *H04N 19/18* (2014.11); *H04N 19/187* (2014.11); *H04N 19/30* (2014.11); *H04N 19/40* (2014.11); *H04N 19/61* (2014.11); *H04N 19/66* (2014.11); *H04N 21/234309* (2013.01); *H04N 21/234327* (2013.01); *H04N 21/8451* (2013.01)

(58) Field of Classification Search
CPC ........ H04N 19/30; H04N 19/14; H04N 19/18; H04N 19/40; H04N 19/187; H04N 19/66; H04N 19/124
USPC ............ 375/240.12, 240.16, 240.23, 240.26; 348/390.1
See application file for complete search history.

(56) References Cited

U.S. PATENT DOCUMENTS

| | | | |
|---|---|---|---|
| 6,795,506 B1* | 9/2004 | Zhang | ................. H04L 12/5693 348/390.1 |
| 6,847,656 B1 | 1/2005 | Wu et al. | |
| 6,925,120 B2 | 8/2005 | Zhang et al. | |
| 6,959,042 B1 | 10/2005 | Liu et al. | |
| 9,118,939 B2* | 8/2015 | Magee | ........... H04N 21/234309 |
| 2007/0121723 A1* | 5/2007 | Mathew | ......... H04N 21/234327 375/240.12 |
| 2007/0223595 A1 | 9/2007 | Hannuksela et al. | |
| 2008/0219354 A1* | 9/2008 | Segall | ................. H04N 19/176 375/240.23 |
| 2008/0232465 A1 | 9/2008 | Zhang | |
| 2009/0129472 A1 | 5/2009 | Panusopone et al. | |
| 2009/0238279 A1 | 9/2009 | Tu et al. | |
| 2009/0268816 A1 | 10/2009 | Pandit et al. | |
| 2010/0067580 A1* | 3/2010 | Sachdeva | ............. H04N 19/176 375/240.16 |
| 2010/0091841 A1 | 4/2010 | Ishtiaq et al. | |
| 2010/0161692 A1 | 6/2010 | Visharam et al. | |
| 2010/0198887 A1 | 8/2010 | Visharam et al. | |

OTHER PUBLICATIONS

"JSVM Software Manual", Telecommunication Union, ITU-T Drafts, Study Group 16, Nov. 4, 2009.

Official Action, RE: Korean Application No. 10-2013-7019181 (Foreign Text and English Translation), dated Jun. 20, 2014.

"Advanced Video Coding for Generic Audiovisual Services: Series H: Audiovisual and Multimedia Systems, Infrastructure of Audiovisual Services—Coding of Moving Video", Telecommunication Standardization Sector of ITU, ITU-T Recommendation H.264, Mar. 2009, 670 pgs.

"Information Technology—Generic Coding of Moving Picture and Associated Audio Information: Systems", International Standard, ISO/IEC/13818-1, Dec. 2000, 174 pgs.

"Dod Standard Internet Protocol", by Information Sciences Institute, RFC 760, Jan. 1980, 47 pgs.

J. Postel, "User Datagram Protocol", RFC 768, Aug. 28, 1980, 3 pgs.

M. Jacobs, et al., "Statistical Multiplexing using SVC", Broadband Multimedia Systems and Broadcasting, IEEE International Symposium, Mar. 2008, 6 pgs.

Fraunhofer, "The Scalable Video Coding Amendment of the H.264/AVC Standard", found at URL <http://ip.hhi.de/imagecom_G1/savce/>, downloaded on Dec. 7, 2010, 13 pgs.

I. Amounou, et al., "Optimized Rate-Distortion Extraction with Quality Layers in the Scalable Extension of H.264/AVC", IEEE Transactions on Circuits and Systems for Video Technology, vol. 17, No. 9, Sep. 2007, 8 pgs.

PCT Search Report & Written Opinion, RE: Application No. PCT/US2011/061676, dated Mar. 1, 2012.

Y. Wang, et al., "Bit Allocation for Scalable Video Coding of Multiple Video Programs", 2010 17th IEEE International Conference on Image Processing, Sep. 26, 2010, 4 pgs.

JSVM Software Manual, ITU-T Drafts, Study Period 2009-2012, International Telecommunication Union, Study Group 16, Nov. 2009, 76 pgs.

"Joint Scalable Video Model JSVM-9", Motion Picture Expert Group or ISO/IEC, Jan. 2007, 84 pgs.

H. Schwarz, et al., "Overview of the Scalable Video Coding Extension of the H.264/AVC Standard", IEEE Transactions on Circuits and Systems for Video Technology; vol. 17, No. 9, Sep. 1, 2007, 18 pgs.

M. Sablatschan, et al., "Towards an Improved SVC-to-AVC Rewriter", Advances in Multimedia Conferences, Jun. 13, 2010, 4 pgs.

* cited by examiner

SVC-TO-AVC REWRITER WITH OPEN-LOOP STATISTAL MULTPLEXER

CROSS-REFERENCE TO RELATED APPLICATIONS

This application is a continuation of U.S. patent application Ser. No. 12/973,458, filed Dec. 20, 2010.

BACKGROUND

The use of streaming media servers to support cable television, IPTV, and wireless video transmission present many challenges. For instance, different clients such as standard definition (SD) and high definition (HD) set top terminals, personal computers and PDAs and mobile phones can have different display, power, communication, and computational capabilities. A successful video streaming system needs to be able to stream video to these heterogeneous clients. By way of example, in the context of cable television and IPTV, industry standard transmission rates support both standard definition and high definition. Because of the difference in encoding between an SD and an HD version of the same program, the HD version typically requires a 4-5 times higher transmission rate and 4-5 times more storage space on the server. Depending on the encoding technique and the length of program, typical transmission rates range from between 2-4 Mbps for SD programming and 8-15 Mbps for HD programming transmission rates and typical file storage requirements range from around 0.75-1.66 GBytes/hour for SD and 3-7 GBytes/hour for HD. In contrast, wireless devices, which typically support much lower network interface transmission rates and much lower display resolutions, have transmission rates of about 0.256-1 Mbps and file storage requirements of 100-400 Mbytes/hour.

One way to support a wide variety of different client devices without maintaining multiple files of the same program in different formats is to employ scalable coding techniques. Scalable coding generates multiple layers, for example a base layer and an enhancement layer, for the encoding of video data. The base layer typically has a lower bit rate and lower spatial resolution and quality, while the enhancement layer increases the spatial resolution and quality of the base layer, thus requiring a higher bit rate. The enhancement layer bit stream is only decodable in conjunction with the base layer, i.e. it contains references to the decoded base layer video data which are used to generate the final decoded video data. By using scalable coding, a single file can be streamed to client devices with different capabilities. Each client device can then decode only those layers it needs and is capable of supporting.

Scalable encoding has been accepted for incorporation into established video coding standards. In particular, the Scalable Video Coding (SVC) extension of the H.264/AVC (AVC) video coding standard features spatial, quality and temporal scalability. Backwards compatibility with legacy decoding devices is maintained through an H.264/AVC compliant base layer, which represents the lowest quality of an SVC bit-stream. However, it is often desirable to also provide the higher quality layers to legacy H.264/AVC devices.

Streaming media servers may be used in combination with statistical multiplexing techniques in order to deliver content to client devices. In statistical multiplexing, several programs each comprising a compressed video bit stream are combined into a single multiplexed bit stream, e.g., for transmission on a single channel. When a statistical multiplexer combines multiple bit streams, an algorithm may be used to adapt the bit rate of each stream but the total bit rate of the output multiplex may be kept at a constant value. Statistical multiplexing encompasses multiplexing architecture having a reverse message path from the multiplexer to the encoders. This is also often referred to closed-loop statistical multiplexing. Closed-loop statistical multiplexers are typically higher in cost than open-loop statistical multiplexers because they require high performance encoders and thus are typically only used to transmit bit streams over a channel that serves many subscribers. Open-loop statistical multiplexers are less expensive and therefore can be used to transmit bit streams over a channel that serves a much smaller set of subscribers.

Although the delivery of content using both SVC streams and statistical multiplexing can be very effective, it is generally not practical because, as noted above, most legacy client devices do not incorporate SVC decoders. Rather, most legacy devices can only decode the AVC compliant base layer, which represents the lowest quality of an SVC bit-stream. However, it is often desirable to also provide the higher quality layers to legacy AVC client devices.

While statistical multiplexing can be used with AVC streams to deliver content, such a technique does not offer the aforementioned advantages that can arise from the use of SVC streams. In addition, if lower cost open-loop statistical multiplexers are used to multiplex AVC streams, only a very limited increase in efficiency can be achieved, in part because AVC streams are already coded relatively efficiently. In particular, open-loop statistical multiplexing generally cannot reduce the bit rate of an AVC stream by more than about 10% without an unacceptable degradation in video quality.

SUMMARY

In accordance with the present invention, a method and apparatus is provided for processing a plurality of multilayer bit streams. The method includes receiving a plurality of multilayer bit streams each having a base layer and at least one enhancement layer. One or more of the enhancement layers are extracted in whole or in part from at least one of the multilayer bit streams so that the plurality of multilayer bit streams are collectively reduced in their total bandwidth. Each of the multilayer bit streams are rewritten to a single layer bit stream. The single layer bit streams are multiplexed to form a multiplexed single layer bit stream.

In accordance with another aspect of the invention, an apparatus is provided for statistically multiplexing and rewriting a scalable bit. The apparatus includes a plurality of bit rate extraction units for receiving a plurality of multilayer bit streams. The bit rate extraction units are each configured to extract one or more enhancement layers in whole or in part from at least one of the multilayer bit streams so that the plurality of multilayer bit streams are collectively reduced in their total bandwidth. A plurality of multilayer to single-layer rewriters is provided for converting the plurality of multilayer bit streams received from the bit rate extraction units to a plurality of single-layer bit streams. A multiplexer is provided for multiplexing the single layer bit streams to form a multiplexed single layer bit stream.

In accordance with another aspect of the invention, a method is provided for processing a plurality of multilayer bit streams. The method includes receiving a plurality of scalable bit streams. The bit rate of one or more the multilayer bit streams are adapted so that the plurality of scalable bit streams collectively have a prescribed bit rate.

The plurality of scalable bit streams having the prescribed bit rate are converted to a plurality of non-scalable bit streams. The plurality of non-scalable bit streams is multiplexed to provide a multiplexed non-scalable bit stream.

DETAILED DESCRIPTION

Figure 1:
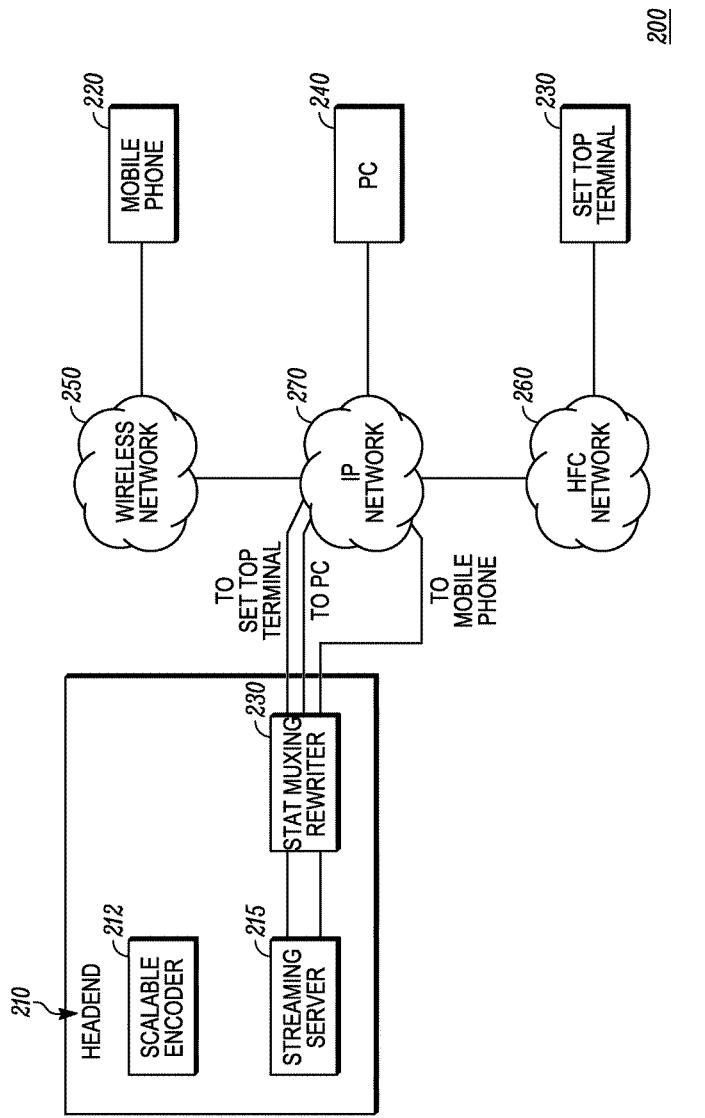
FIG. 1 shows one example of an architecture that can be used to deliver video and other content and services to users associated with a variety of different client devices.

FIG. 1 shows one example of an architecture 200 that can be used to deliver video and other content and services to users associated with a variety of different client devices, which may include, without limitation, PCs, PDAs, portable computers, media centers, portable media players, mobile telephones and set-top boxes. In this illustrative example, three client devices are shown, a mobile phone 220, a set top terminal 230 and a personal computer (PC) 240. A headend 210 is in communication with each of the client devices 220, 230 and 240 via IP network 270. Mobile phone 220 communicates with headend 210 over the IP network 270 and a wireless network such as a GSM or a UMTS network, for example. Set top terminal 230 communicates with headend 210 over the IP network 270 and a hybrid fiber/coax (HFC) network 260 and PC 240 communicates with the headend 210 over the IP network 270, typically via an Internet service provider (not shown). Of course, the architecture depicted in FIG. 1 is presented for illustrative purposes only. More generally, a wide variety of different client devices may communicate with the headend over other types of networks including, for instance, all-coaxial, xDSL (e.g., ADSL, ADLS2, ADSL2+, VDSL, and VDSL2) and satellite systems.

The headend 210 is the facility from which a network operator delivers programming content and provides other services to the client devices. As detailed below, the headend 210 may include a streaming server 215 for streaming the programming content that is encoded by a scalable encoder 212. The term "streaming" is used to indicate that the data representing the media content is provided over a network to a client device and that playback of the content can begin prior to the content being delivered in its entirety (e.g., providing the data on an as-needed basis rather than pre-delivering the data in its entirety before playback).

In a conventional arrangement, the headend maintains and manages multiple copies of each program. Each copy contains a different rendition of the program that is tailored to the display characteristics of the different client devices. When a scalable encoder 212 performing scalable coding is employed, each client device may receive the same scalable coded transport stream that is delivered by the headend 210. Unfortunately, as previously mentioned, the enhancement layers in SVC streams cannot be decoded by most legacy client devices. Nevertheless, one way to retain many of the advantages of scalable coding is by converting the SVC streams into AVC streams, which can be decoded by a wide variety of legacy devices. Before conversion, however, the SVC streams may need to be adapted to lower bitrate SVC streams so that they can be accommodated by the channel over which they are to be transported and so that they drop any enhancement layers that cannot be used by less capable client devices. These two functions are performed by the statistical multiplexing rewriter (SMR) 230, which receives the SVC streams from streaming server 215. That is, SMR 230 performs a statistical multiplexing function and an SVC-to-AVC conversion function.

Figure 2:
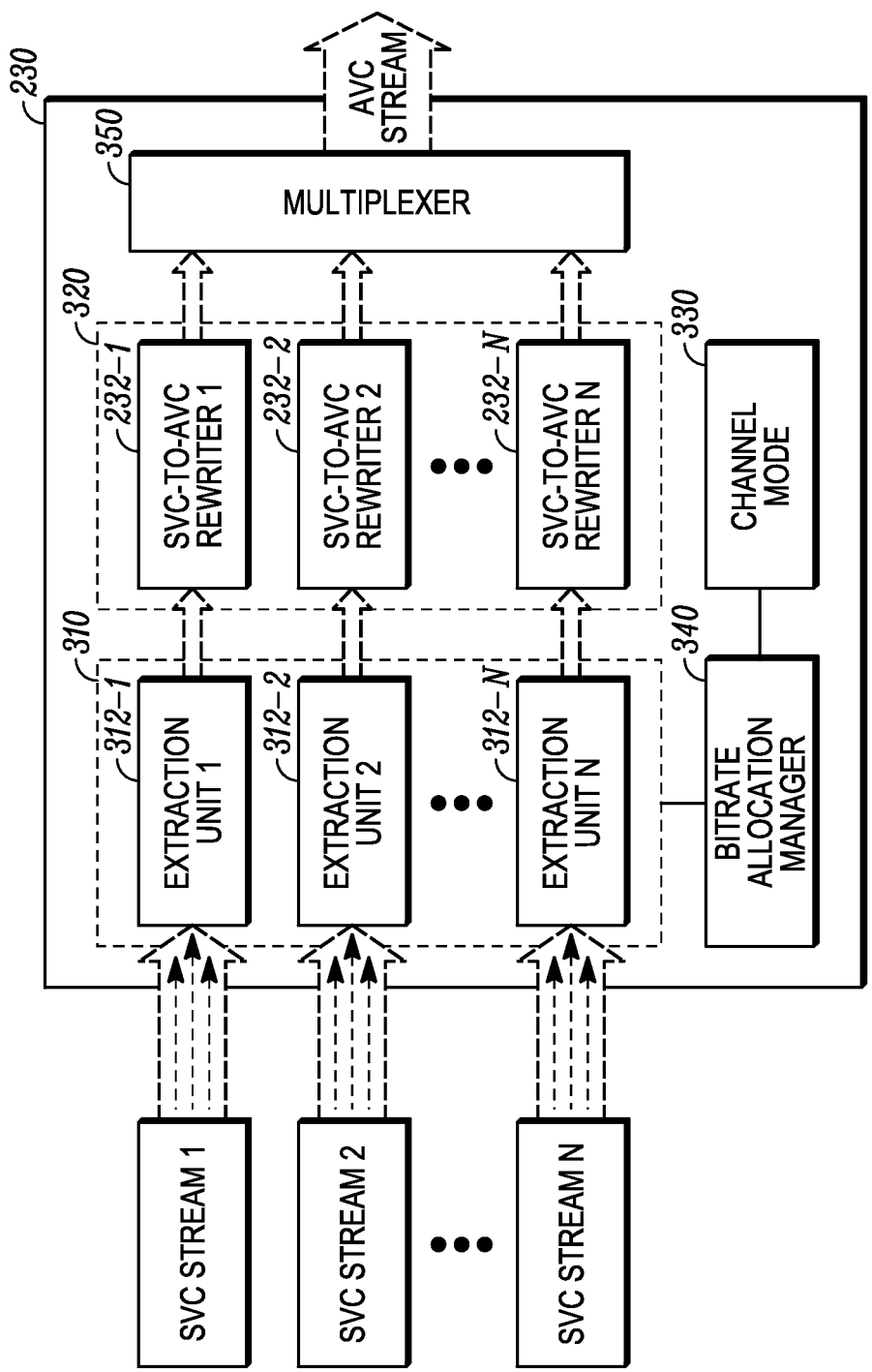
FIG. 2 shows one example of the statistical multiplexing rewriter in FIG. 1.

One example of SMR 230 is shown in FIG. 2. Regarding its statistical multiplexing function, the SMR 230 receives one or more SVC streams that individually each have a specified bitrate and outputs a multiplexed AVC stream at a target total output bitrate. The SMR 230 achieves the target output bitrate in an open-loop manner by transcoding one or more of the input SVC streams so that collectively their total bitrate corresponds to the desired output bitrate. After performing its statistical multiplexing function, the SMR 230 then converts the SVC stream to an AVC stream in a process that will be described below.

As shown in FIG. 2, the SMR 230 includes an extraction stage 310 and an SVC-to-AVC rewriting stage 320. The extraction stage 310 includes a series of bit stream extraction units $312_1, 312_2, \ldots 312_n$ that each receive an SVC stream. The SVC-to-AVC rewriting stage 320 includes a series of SVC-to-AVC rewriters $232_1, 232_2, \ldots 232_n$, which each respectively receive a bit stream from a respective one of the bit-rate extraction units $312_1, 312_2, \ldots 312_n$. The extraction stage 310 performs statistical multiplexing and the SVC-to-AVC rewriting stage performs SVC-to-AVC conversion. The SMR 230 also includes a bit rate allocation manager 340 for determining the bandwidth that is to be allocated by the bit-rate extraction units $312_1, 312_2, \ldots 312_n$ to the SVC streams and a channel model database 330 that contains channel information which the allocation manager 340 uses in its analysis. A multiplexer 350 multiplexes the AVC streams received from the rewriting stage to provide a multiplexed AVC stream that can be transmitted over a channel in a network.

Turning first to the open-loop statistical multiplexing function of the SMR 230, in a conventional open-loop statistical multiplexer transcoding is typically accomplished by fully or partially decoding the bit stream and re-quantizing it to achieve a lower bitrate. However, in SMR 230 transcoding is being performed on an SVC stream. As previously discussed, scalable coding employs a base layer and one or more enhancement layers. An SVC stream with multiple enhancement layers having one bitrate can be adapted to an SVC stream at a lower bitrate simply by truncating sufficient enhancement layers or parts thereof from the initial SVC stream. Adaptation of an SVC stream can be accomplished by the bit-rate extraction units in the extraction stage 310 using an extractor process to extract from the SVC stream a substream with a particular average bit rate.

The bit-rate extraction units $312_1, 312_2, \ldots 312_n$ in SMR 230 can perform bit rate adaptation by truncating the appropriate layers from the scalable coded video stream in a variety of different ways. For example, the extraction units can examine an incoming SVC stream to determine the packet ID (PID) types, the location of key frames, bit rate and other pertinent information. In particular, the extraction units can distinguish between the PIDs assigned to packets that carry the base layer and the PIDs assigned to packets that contain each enhancement layer. In this way when the SMR 230 is delivering content to one or more particular client devices, it can drop any packets having a PID assigned to an enhancement layer that is not needed by that client device or it can drop packets to achieve a lower bit rate to accommodate varying network conditions such as bandwidth limitations of the channel over which the stream is transported.

In other implementations the bit-rate extraction units $312_1, 312_2, \ldots 312_n$ may extract individual Network Abstraction Layer (NAL) units from the SVC streams, which are the elementary units into which the coded data is organized. For instance, the bit rate of the SCV stream can be adjusted by discarding different quality refinement NAL units. In one example, a priority identifier is assigned to each coded slice NAL unit by the encoder. The SVC syntax provides different means for including such information in a bit stream. During the extraction process, coded slice NAL units with the lowest priority are discarded, and if the target bit rate is not reached, coded slice NAL units of the next priority class are discarded, and so on, until the target bit rate is reached. Additional details concerning this technique may be found in I. Amonou et al., "Optimized rate-distortion extraction with quality layers," *IEEE Trans. Circuits Syst. Video Technol.*, vol. 17, no. 9, pp. 1186-1193, September 2007.

The bit rate allocated to each stream that is received by the extraction units $312_1, 312_2, \ldots 312n$ is determined by data contained in the channel model database 330. This data allows the capacities and requirements of each channel that is received by the client devices to be estimated. For instance, the channel model database may include information that specifies the number of streams each channel can support, its maximum bit rate, whether the streams are multicast or unicast, whether forward-error-correction (FEC) is used, whether the programming in the streams is premium or non-premium content and whether it is live or video-on-demand content, and so on.

The channel model data is sent to the bit rate allocation manager 340. The allocation manager 340 analyzes this data to determine a suitable allocation of bits that each extraction unit is to assign to the SVC streams. The allocation manager 340 sends information regarding the allocated bit rate to each of the extraction units. The extraction units in turn adjust the bit rate of the bit streams they are receiving in accordance with the allocation determined by the allocation manager 340. The bit rate allocation manager 340 may allocate bits to each stream in any appropriate manner. In one implementation, the manager 340 allocates just enough bits to each stream so that the perceptual video quality is the same for all streams. This assumes that all the streams have the same priority, which of course may not always be the case. The channel model generally specifies the priority of each stream. In the case that certain streams have a higher priority, as might be the case for premium channels, for example, then those channels would tend to have better quality than lower priority channels.

The following model may be used when all the streams have equal or different priorities, even if they have significantly different complexities. In this example the bit rate allocated to stream i, $B_i$, can be determined as follows:

$$B_i = B_T \frac{p_i \times c_i}{\sum_{j=1}^{N}(p_j \times c_j)}$$

where $B_i$=the bit rate allocated to stream i.
$B_T$=the total bit rate available to the set of streams 1 through N.
$p_i$=the priority of stream i.
$c_i$=the complexity of stream i.

As previously mentioned, the priority of the stream may be data supplied by the channel model.

The complexity of the stream may be transmitted by the source encoder as metadata. It may also be calculated internally by the bit rate allocation model that is employed. Complexity is a measure the number of bits required to achieve a specific level of perceptual quality. One way to measure complexity is to measure the number of bits required to code content at a predetermined and constant quantization level. Another way to measure complexity is to measure the average quantization values of stream, and measure the average number of bits used in the stream, and input these values into a predetermined look-up table that maps quantization value and number of bits to a complexity value. This latter method may be part of the bit rate allocation model.

After the extraction units have performed bit rate adaptation as described above, the SVC-AVC rewriters 320 perform a conversion process to efficiently convert SVC streams to AVC streams. This conversion process can be achieved by a process that is referred to as bit stream rewriting. Bit stream rewriting takes advantage of the similarities between the SVC and AVC codecs so that complete transcoding of the bit stream is not required.

Figure 3:
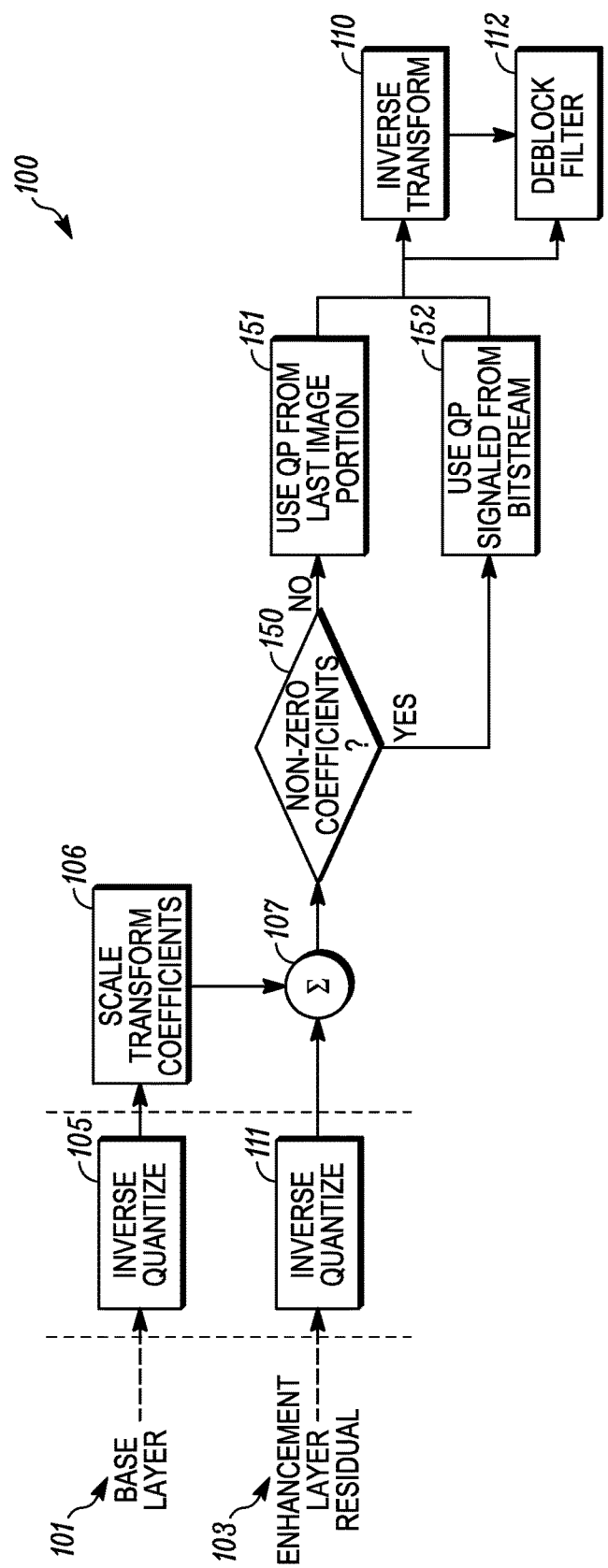
FIG. 3 is a functional block diagram depicting one example of a rewriter that may be employed in the statistical multiplexing rewriter of FIG. 2.

FIG. 3 is a functional block diagram depicting one example of a rewriter that may be employed as the rewriters $232_1, 232_2, \ldots 232_n$ of FIG. 2. Of course, this example is shown for illustrative purposes and more generally other rewriting techniques may be used as well. In this implementation a base layer 101 and enhancement layer 103 are received at the SVC-AVC rewriter 100. The base layer data may be inverse quantized 105 and the transform coefficients may be scaled 106 to match a characteristic of the enhancement layer. In some embodiments, the matched characteristic may comprise a quantization parameter characteristic. The enhancement layer 103 may also be inverse quantized 111 and added 107 to the scaled base residual coefficients to create combined coefficients. These combined coefficients may then be analyzed to determine 150 whether non-zero transform coefficients are present. If non-zero transform coefficients are present, a quantization parameter signaled in the bit stream may be used for processing 152 that portion of the image. If no non-zero transform coefficients are present, a quantization parameter from a previous or last image portion 151 may be used for processing that portion of the image.

In some embodiments, the combined coefficients are then inverse transformed 110 to produce spatial domain intensity values. In some embodiments, the base layer information may be ignored when it is not needed. The spatial domain intensity values may then be filtered 112 to remove blocking artifacts or for other reasons. This filtering may utilize or be dependent on the quantization parameter selected 151, 152 with reference to non-zero transform coefficients.

Additional details concerning SVC-AVC rewriting may be found in the JSVM (Joint Scalable Video Model) Software Manual, version JSVM 9.19.9, which is the reference software for the Scalable Video Coding (SVC) project of the Joint Video Team (JVT) of the ISO/IEC Moving Pictures Experts Group (MPEG) and the ITU-T Video Coding Experts Group (VCEG).

In the examples presented above the statistical multiplexing rewriter has been described as being located in the headend of a network operator that delivers programming content. More generally, it should be noted that the statistical multiplexing rewriter may be located anywhere throughout the network. For instance, the statistical multiplexing rewriter may be located near the edge of a network or even on the customer premises. In this way the network operator can store and deliver one master version of the content to the location where its bit rate needs to be adapted because of different, limited bandwidth capabilities and client device capabilities. For instance, on the customer premises, which may be limited to a bandwidth of say, 20 Mbit/sec, the bit rate of content can be adjusted depending on the number of different programs simultaneously being rendered on multiple displays. Accordingly, a higher bit rate can be allocated to a program when it is the only program being rendered while lower bit rates may be allocated to each program when two or more programs are being rendered.

As another example, a local cable provider serving a few thousand customers may use the statistical multiplexing rewriter within its local loop to deliver content. In all these examples the statistical multiplexing rewriter can be used in a cost-effective manner despite the relatively small number of customers involved since the statistical multiplexing rewriter uses open-loop statistical multiplexing and therefore is significantly less expensive to deploy than a closed-loop multiplexing device.

In the examples presented above the statistical multiplexing rewriter receives bit streams that conform to the SVC standard and outputs a multiplexed bit stream that conforms to the AVC standard. However, the methods and techniques described herein are equally applicable to other scalable and non-scalable standards. Thus, more generally, the statistical multiplexing rewriter may receive two or more multilayer steams and output a multiplexed single-layer stream.

Figure 4:
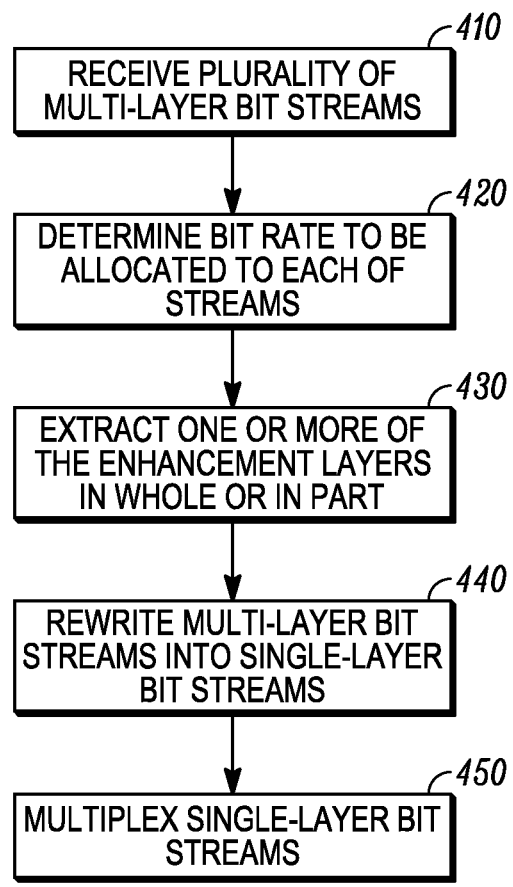
FIG. 4 is a flow chart illustrating one example of a method for processing a plurality of multilayer bit streams such as scalable video coding (SVC) steams.

FIG. 4 is a flow chart illustrating one example of a method for processing a plurality of multilayer bit streams. The method begins at step 410 when a plurality of multilayer bit streams are received. Each multilayer bit stream has a base layer and at least one enhancement layer. In step 420, a bit rate to be allocated to each of streams in determined. This determination may be made on any appropriate basis such as by examining, for example, one or parameters whose values may be stored in a channel model database. One or more of the enhancement layers is extracted in whole or in part from at least one of the multilayer bit streams in step 430 so that the bit rates of the multilayer bit streams are adapted in conformance to the bit rate allocation that has been made. Next, in step 440, each of the multilayer bit streams undergo a rewriting process to a single layer bit stream. The single layer bit streams are multiplexed in step 450 to form a multiplexed single layer bit stream, which subsequently can be communicated over a network channel.

As used in this application, the terms "component," "module," "unit," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

The invention claimed is:

1. A method for processing a plurality of multilayer bit streams, comprising:
   receiving a plurality of scalable video coding (SVC) multilayer bit streams each having a base layer and enhancement layers;
   obtaining video service provider bit rate allocation management parameters, wherein the bit rate to be allocated to each of the multilayer bit streams is determined based at least in part on information pertaining to a channel over which a multiplexed single layer non-SVC bit stream is to be transported;
   producing bit rate allocations for multiple simultaneous programs in a manner that tends to equalize video quality across programs to the extent that is consistent with the bit rate allocation management parameters specified by the video service provider;
   selecting enhancement layers for each program in a manner that is consistent with the bit rate allocation and bit rate allocation parameters;
   extracting one or more of the enhancement layers in whole or in part from at least one of the multilayer bit streams so that the plurality of multilayer bit streams are collectively reduced in their total bandwidth, and so that each program in each of the enhancement layers is provided in such a manner that is consistent with the bit rate allocation and bit rate allocation parameters;
   rewriting each of the extracted enhancement layers to produce a single layer bit stream for each of the extracted enhancement layers; and
   multiplexing the single layer bit streams to form the multiplexed single layer non-SVC bit stream.

2. The method of claim 1, wherein the information pertaining to a channel over which the multiplexed single layer bit stream is to be transported includes a maximum number of bit streams the channel can support, a maximum bit rate the channel can support, an whether the multilayer bit streams are multicast or unicast streams.

3. The method of claim 1, wherein the bit rate to be allocated to each of the multilayer bit streams is determined based at least in part on a priority assigned to each of the streams.

4. The method of claim 1, wherein multilayer bit streams having a common priority are each allocated a bit rate needed to produce a common level of perceptual quality.

5. The method of claim 1, wherein in the step of obtaining video service provider bit rate allocation management parameters, the bit rate allocation management parameters include at least one of program stream priority, maximum program resolution, maximum program bit rate and maximum total bit rate that may be allocated.

6. The method of claim 1, wherein the step of selecting enhancement layers for each program is selected particularly based on resolution and frame rate.

7. The method of claim 1, wherein bit rate adaptation is performed in accordance with an open-loop technique.

8. The method of claim 1, wherein the enhancement layers represent enhanced luminance, including coverage for high-dynamic range.

9. The method of claim 1, wherein the enhancement layers represent enhanced color gamut, including a wide color gamut.

10. The method of claim 1, wherein the enhancement layers represent enhanced bit depth, including coverage for 10-bit and 12-bit HEVC and HEVC MAIN 10.

11. The method of claim 1, wherein the enhancement layers represent enhanced virtual reality data.

12. The method of claim 1, wherein the enhancement layers represent enhanced stereoscopic data, including coverage for 3D.

13. The method of claim 1, wherein the enhancement layers represent an enhanced frame rate.

14. The method of claim 1, wherein the SVC bitstreams comprise any combination of block-based and wavelet-based base-layer and enhance-layer coding.

* * * * *